United States Patent
Arul Dhas et al.

(10) Patent No.: US 11,636,059 B2
(45) Date of Patent: Apr. 25, 2023

(54) SCALING PERFORMANCE IN A STORAGE SERVER WITH STORAGE DEVICES

(71) Applicant: SAMSUNG ELECTRONICS CO., LTD., Suwon-si (KR)

(72) Inventors: Benixon Arul Dhas, San Jose, CA (US); Ramaraj Pandian, San Jose, CA (US); Ronald Lee, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 19 days.

(21) Appl. No.: 16/886,713

(22) Filed: May 28, 2020

(65) Prior Publication Data

US 2021/0303500 A1  Sep. 30, 2021

Related U.S. Application Data

(60) Provisional application No. 63/003,151, filed on Mar. 31, 2020.

(51) Int. Cl.

| G06F 13/40 | (2006.01) |
|---|---|
| G06F 3/06 | (2006.01) |
| G06F 13/37 | (2006.01) |
| H04L 67/1008 | (2022.01) |
| H04L 67/141 | (2022.01) |
| H04L 69/325 | (2022.01) |

(52) U.S. Cl.
CPC ............ *G06F 13/4068* (2013.01); *G06F 3/06* (2013.01); *G06F 3/0613* (2013.01); *G06F 3/0635* (2013.01); *G06F 3/0689* (2013.01); *G06F 13/37* (2013.01); *H04L 67/1008* (2013.01); *H04L 67/141* (2013.01); *H04L 69/325* (2013.01)

(58) Field of Classification Search
CPC .. G06F 13/4068; G06F 3/0613; G06F 3/0635; G06F 3/0689; G06F 13/37; H04L 67/1008; H04L 67/141; H04L 69/325
See application file for complete search history.

(56) References Cited

U.S. PATENT DOCUMENTS

| 6,615,282 B1 * | 9/2003 | Futral .................. G06F 13/385 710/1 |
|---|---|---|
| 6,779,039 B1 | 8/2004 | Bommareddy et al. |
| 2004/0264481 A1 | 12/2004 | Darling et al. |
| 2006/0195698 A1 | 8/2006 | Pinkerton et al. |
| 2008/0285441 A1 | 11/2008 | Abdulla et al. |
| 2010/0302940 A1 | 12/2010 | Patel et al. |
| 2013/0336320 A1 | 12/2013 | Rangaraman |
| 2013/0343378 A1 | 12/2013 | Veteikis et al. |
| 2016/0253212 A1 * | 9/2016 | Solihin ............... G06F 12/0806 718/104 |
| 2017/0149878 A1 | 5/2017 | Mutnuru |
| 2018/0253260 A1 * | 9/2018 | Marripudi ............. G06F 3/0688 |

(Continued)

OTHER PUBLICATIONS

Coleman, "Rendezvous Hashing Explained" Dec. 24, 2020 (Year: 2020).*

*Primary Examiner* — Phong H Dang
(74) *Attorney, Agent, or Firm* — Lewis Roca Rothgerber Christie LLP

(57) ABSTRACT

Provided is a method of packet processing, the method including receiving an input/output (IO) request from a host, selecting a drive corresponding to the IO request using a hashing algorithm or a round-robin technique, and establishing a connection between the host and the drive.

20 Claims, 4 Drawing Sheets

(56) References Cited

U.S. PATENT DOCUMENTS

| | | | |
|---|---|---|---|
| 2019/0042440 A1* | 2/2019 | Kumar | G06F 3/0607 |
| 2019/0109949 A1 | 4/2019 | Seetharaman et al. | |
| 2019/0317901 A1* | 10/2019 | Kachare | G06F 12/1009 |
| 2019/0324662 A1 | 10/2019 | Yu et al. | |
| 2020/0065264 A1* | 2/2020 | Gissin | G06F 3/0659 |
| 2020/0349079 A1* | 11/2020 | Armangau | G06F 12/0835 |
| 2021/0021524 A1* | 1/2021 | Alper | H04L 47/125 |

\* cited by examiner

SCALING PERFORMANCE IN A STORAGE SERVER WITH STORAGE DEVICES

CROSS-REFERENCE TO RELATED APPLICATION(S)

This application claim priority to, and the benefit of, U.S. Provisional Application Ser. No. 63/003,151, filed Mar. 31, 2020, entitled LINEARLY SCALING PERFORMANCE IN A NON-VOLATILE MEMORY EXPRESS (NVME) OVER FABRICS STORAGE SERVER WITH NVME KEY VALUE DRIVES, the content of which being incorporated herein in its entirety.

FIELD

One or more aspects of embodiments of the present disclosure relate generally to data storage, and to improving performance of a storage server having storage devices.

BACKGROUND

As data storage devices continue to advance, such as with key-value based drives including key-value solid state drives (KVSSDs), the speed at which the storage devices are able operate continues to increase. The speed of these storage devices has may limit the rate at which a data storage system (e.g., a non-volatile memory express (NVME) over fabrics storage server) is able to operate. However, due to the improved performance of the storage devices, and also due to the increased scale at which storage systems must operate, one or more central processing units (CPUs) may be overloaded. The CPUs may be for processing input/output (IO) requests and for coordinating data transfer within the system among multiple storage devices and multiple clients and hosts. The overloading of the CPUs may cause a bottleneck in the system at the CPU.

The above information disclosed in this Background section is only for enhancement of understanding of the background of the disclosure, and therefore may contain information that does not form the prior art.

SUMMARY

Embodiments described herein provide improvements to data storage.

According to embodiments of the present disclosure, there is provided a method of packet processing, the method including receiving an input/output (IO) request from a host, selecting a drive corresponding to the IO request using a hashing algorithm or a round-robin technique, and establishing a connection between the host and the drive.

The hashing algorithm that is used may be a Rendezvous hashing algorithm based on a key corresponding to the IO request, and a drive ID of the drive.

Receiving the IO request from the host may include receiving the IO request at a network-processing module associated with a processor for establishing the connection.

The method may further include forwarding the IO request from the network-processing module associated with the processor to a drive-processing module associated with the processor that is configured to select the drive corresponding to the IO request using the hashing algorithm.

The method may further include using a remote direct memory access protocol by the network-processing module for processing the IO request, and using a transmission control protocol by the drive-processing module for processing data corresponding to the IO request.

The method may further include forwarding the IO request between the network-processing module and a drive-processing module using an atomic ring buffer.

The method may further include assigning one or more other IO requests to one or more respective cores of the processor using the round-robin technique to balance one or more connections between one or more hosts and one or more drives, and to balance a loading of the cores of the processor.

According other embodiments of the present disclosure, there is provided a system for packet processing, the system including a processor including a plurality of cores, and a drive-processing module, wherein one of the cores is configured to receive an input/output (IO) request from a host, the drive-processing module is configured to select a drive corresponding to the IO request using a hashing algorithm or a round-robin technique, and the processor is configured to establish a connection between the host and the drive.

The hashing algorithm that is used may be a Rendezvous hashing algorithm based on a key corresponding to the IO request, and a drive ID of the drive.

The system may further include a network-processing module, wherein the one of the cores is configured to receive the IO request from the host by receiving the IO request at the network-processing module for establishing the connection.

The network-processing module may be configured to forward the IO request to the drive-processing module, which is further configured to select the drive corresponding to the IO request using the hashing algorithm.

The network-processing module may be further configured to use a remote direct memory access protocol for processing the IO request, and the drive-processing module may be further configured to use a transmission control protocol for processing data corresponding to the IO request.

The system may further include an atomic ring buffer that is configured to forward the IO request between the network-processing module and a drive-processing module.

The network-processing module may be further configured to assign one or more other IO requests to one or more respective cores of the processor using the round-robin technique to balance one or more connections between one or more hosts and one or more drives, and to balance a loading of the cores of the processor.

According to yet other embodiments of the present disclosure, there is provided a non-transitory computer readable medium implemented on a system for packet processing, the non-transitory computer readable medium having computer code that, when executed on a processor, implements a method of packet processing, the method including receiving an input/output (IO) request from a host, selecting a drive corresponding to the IO request using a hashing algorithm or a round-robin technique, and establishing a connection between the host and the drive.

The hashing algorithm that is used may be a Rendezvous hashing algorithm based on a key corresponding to the IO request, and a drive ID of the drive.

Receiving the IO request from the host may include receiving the IO request at a network-processing module associated with a processor for establishing the connection.

The computer code, when executed by the processor, may be further configured to implement the method of packet processing by causing the network-processing module associated with the processor to forward the IO request to a drive-processing module associated with the processor, and by causing the drive-processing module to select the drive corresponding to the IO request using the hashing algorithm.

The computer code, when executed by the processor, may be further configured to implement the method of packet processing by causing an atomic ring buffer to forward the IO request between the network-processing module and a drive-processing module.

The computer code, when executed by the processor, may be further configured to implement the method of packet processing by causing the network-processing module to assign one or more other IO requests to one or more respective cores of the processor using the round-robin technique to balance one or more connections between one or more hosts and one or more drives, and to balance a loading of the cores of the processor.

Accordingly, the system and method of embodiments of the present disclosure is able reduce or eliminate CPU bottlenecking to improve data storage by balancing loads among CPU cores and storage devices.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

Figure 1:
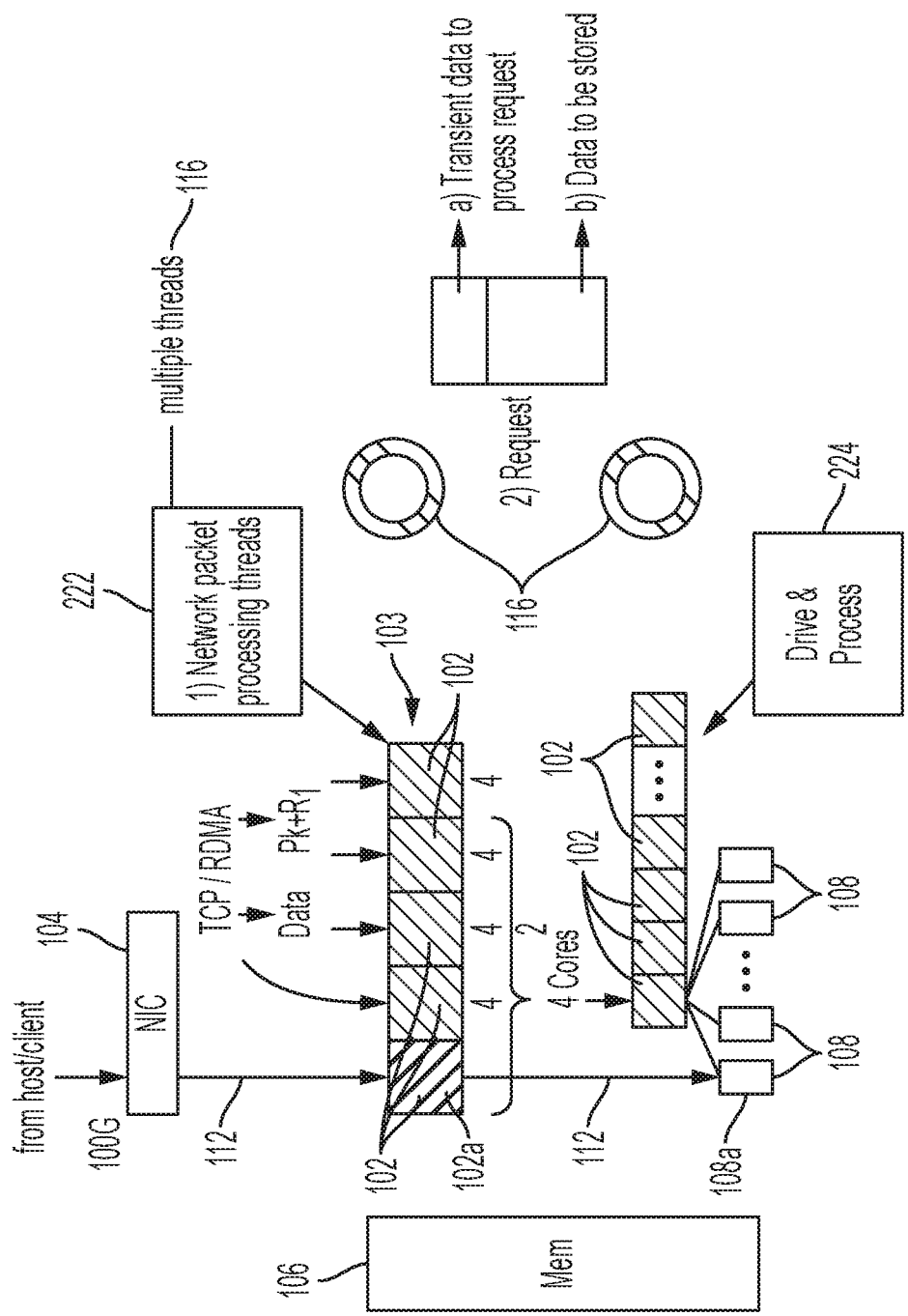
FIG. 1 shows a block diagram depicting a connection between a host and a storage device using a multi-CPU storage appliance for storing data on multiple storage devices, according to some embodiments of the present disclosure.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown in order to facilitate a less obstructed view of these various embodiments and to make the description clear.

DETAILED DESCRIPTION

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described.

Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

In a storage server, when a host establishes a connection, one or more cores of a CPU of the server may be used for processing all requests from the connection, and may forward all of the requests to a single storage drive. Accordingly, the connection established with the host may be able to access all of the drives of a storage system. That is, once a connection is established with a qualified name, then any of the multiple drives can be accessed.

Because a large number of drives are being served, the drives may handle millions of input/output (IO) requests. However, the CPU itself (e.g., the core) may be able to process only a limited number of requests per second (e.g., one million requests per second). Upon reaching this limit, the CPU/core may be a bottleneck of the system if a client tries to access the same connection because the CPU is unable to process more requests at the same time. That is, even if the system supports a 100 Gigabyte network, such throughput may be unable to be achieved due to the bottleneck at the CPU, and some of the available cores may be underutilized.

Accordingly, some of the embodiments disclosed herein provide an architecture for providing improved packet processing using a message-passing architecture.

FIG. 1 shows a block diagram depicting a connection between a host and a storage device using a multi-CPU storage appliance for storing data on multiple storage devices, according to some embodiments of the present disclosure.

Referring to FIG. 1, as mentioned above, as storage device performance increases, bottlenecks in a storage system (e.g., a non-volatile memory express (NVME) over fabrics storage server) may more frequently occur at the central processing unit(s) (CPU(s)) responsible for coordinating IO requests and data transfer associated with multiple IO threads from one or more host applications. As described below, embodiments of the present disclosure improve data storage technology by reducing inefficiencies associated with the coordination handled by the CPU(s), thereby improving overall network performance.

An example memory application or software, which is used as a target of the some embodiments of the present disclosure, may be designed for storage devices, such as block drives 108. As shown, the storage system or network includes a CPU 103 having multiple cores 102, a network interface controller (NIC) 104, a memory 106, and multiple drives 108. The drives 108 may include SSDs, Ethernet SSDs, KVSSDs, etc., although it should be noted that Ethernet SSDs and KVSSDs are subsets of the different types of devices that can be used in the storage system. The memory 106 may include multiple volatile dynamic random-access memory (DRAM) modules 207 (e.g., see FIG. 2).

When a host establishes a connection via the NIC 104, one of the cores 102a of the CPU 103 may be used for processing all of the requests 112 (e.g., IO requests) from the connection to the host, and may forward all of the requests 112 to a single drive 108a. Accordingly, the host is able to access all of the drives 108 via the connection. That is, once a connection by the host is established with a qualified name, then any of the multiple drives 108 can be accessed.

Because a relatively large number of storage devices or drives 108 may be served, the drives 108 may handle a quantity (e.g., millions) of IO requests 112 from various hosts. However, the CPU 103 itself (e.g., one or more cores 102 of the CPU 103) may be able to only process a limited number of requests 112 per second (e.g., up to one million requests per second). Upon reaching this limit, the CPU 103, or the core 102, may effectively become a bottleneck in the system, because the CPU 103 may be unable to concurrently process further additional requests 112 if a client attempts to access the same connection via the NIC 104. Accordingly, even if the storage system supports, for example, a 100-Gigabyte network, such throughput might not be able to be fully achieved due to the bottleneck at the CPU 103. Accordingly, even though many cores 102 are available, some of the cores 102 may be underutilized.

Accordingly, as described below, embodiments of the present disclosure provide improved methods and systems for improving latency, and for reducing bottlenecking at the CPU 103, by using modules having allocated CPU resources to enable load balancing among CPU cores and storage devices (e.g., to ensure that none of the CPU cores or storage devices have significantly higher workloads than others of the CPU cores or storage devices while some of the CPU cores or storage devices are underutilized).

Figure 2:
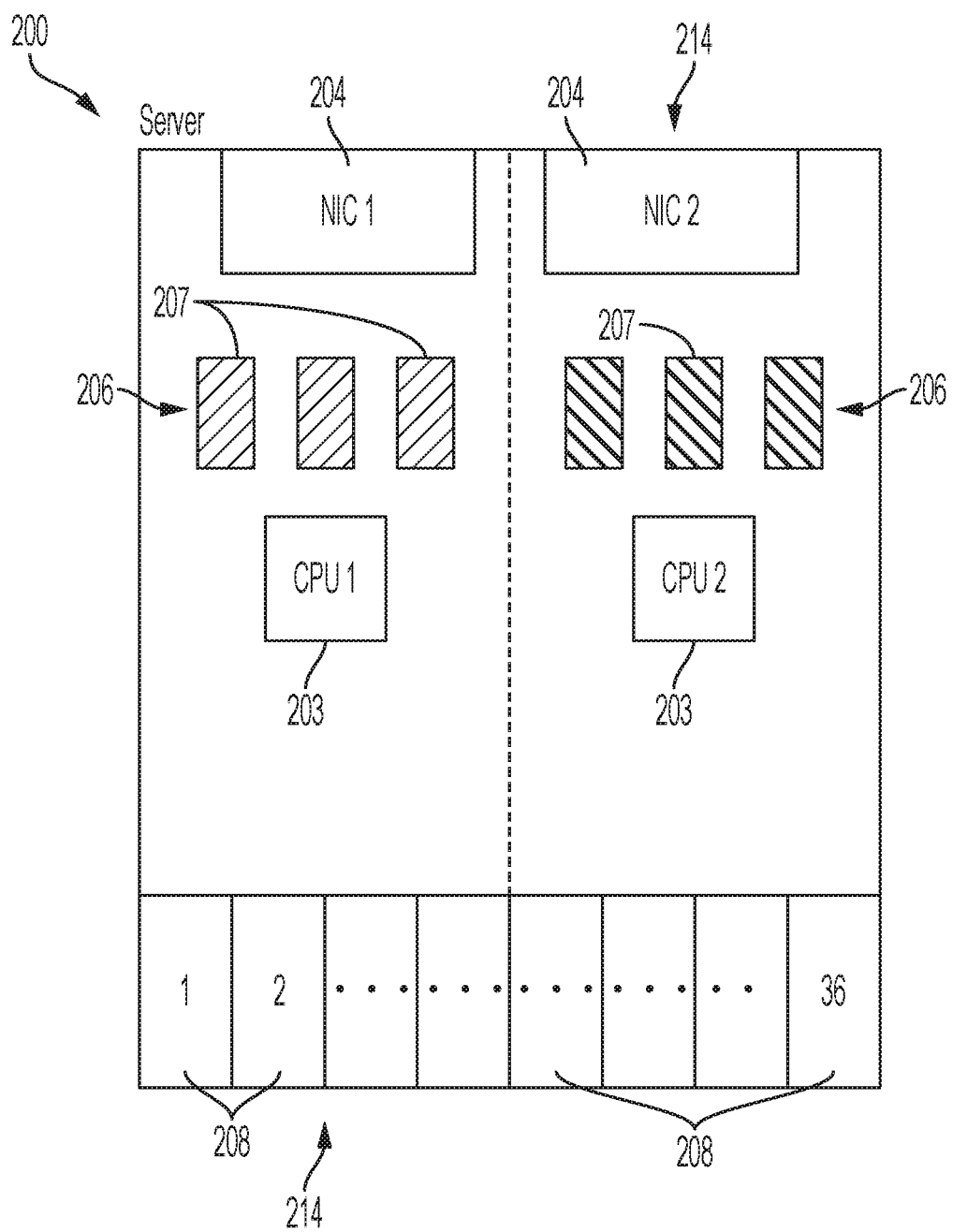
FIG. 2 shows a block diagram of a server including two CPUs in a multi-CPU storage appliance for storing data on multiple storage devices, according to some embodiments of the present disclosure.
Figure 3:
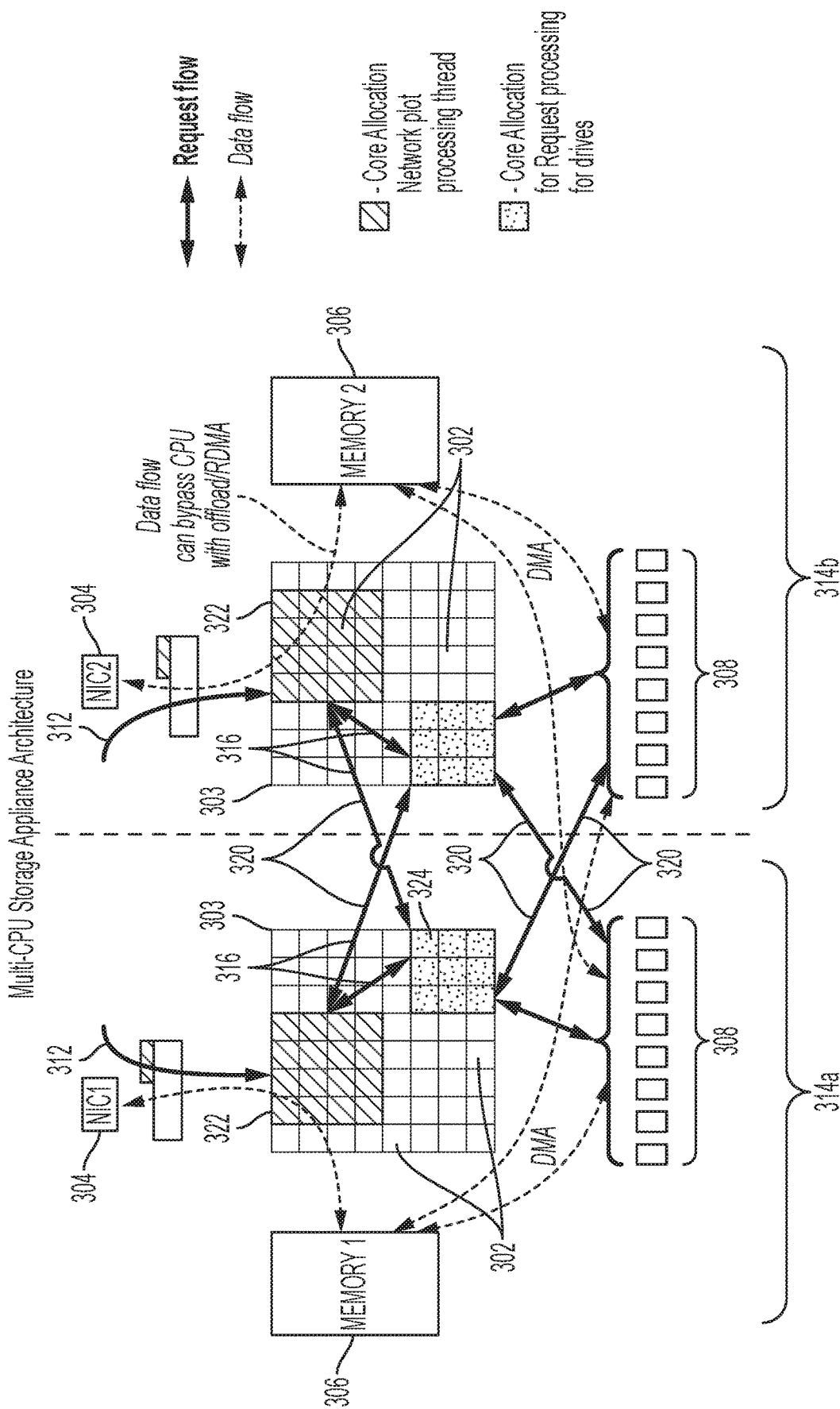
FIG. 3 depicts an architecture for a multi-CPU storage appliance for storing data on multiple storage devices, according to some embodiments of the present disclosure.

FIG. 2 shows a block diagram of a server including two CPUs in a multi-CPU storage appliance for storing data on multiple storage devices, according to some embodiments of the present disclosure, and FIG. 3 depicts an architecture for a multi-CPU storage appliance for storing data on multiple storage devices, according to some embodiments of the present disclosure.

Referring to FIG. 2, in the present example, a server 200 may provide hardware architecture representing two different non-uniform memory access (NUMA) nodes 214, each NUMA node 214 corresponding to a NIC 204, a memory 206 comprising multiple memory modules 207 (e.g., DRAM modules), a CPU 203, and multiple storage devices 208.

NUMA may refer to a method that may be used in a symmetric multiprocessing (SMP) system, where the memory access time is influenced by the location of the memory relative to the processor. NUMA may allow for configuring a cluster of microprocessors in a multiprocessing system so that the microprocessors can share memory locally. Under NUMA, a processor may access its own local memory faster than it is able to access non-local memory (e.g., faster than it is able to access memory that is local to another processor, or memory that is shared between processors). Benefits of NUMA may be most notable for workloads on servers where the data is often associated strongly with certain tasks or users. Accordingly, NUMA may improve performance and enable expansion of the system to be expanded.

Accordingly, the server 200 may have multiple CPU cores at each of the respective CPUs 203 and multiple storage devices 208 (e.g., drives). As described further with respect to FIG. 3, some embodiments of the present disclosure provide one or more protocols or mechanisms that may be implemented to ensure that the workload experienced by the cores and the storage is balanced. That is, as described below, the disclosed embodiments prevent one or more of the cores and/or one or more of the storage devices 208 from being overloaded as a result of multiple IO requests while others of the cores and/or storage devices 208 are unused or underutilized. By avoiding the overloading of some cores and/or storage devices 208 and the underutilization of other cores and/or storage devices 208, bottlenecks at the corresponding CPU 203 that may otherwise restrict data flow may be reduced or eliminated.

Referring to FIG. 3, embodiments of the present disclosure may provide a software architecture for providing high-performance packet processing using a message-passing architecture using the hardware architecture shown in FIGS. 1 and 2. A system of embodiments of the present disclosure may include multiple CPU sockets. The CPU sockets have memory 306 that is bound to each NUMA socket to ensure that each IO request 312 is processed despite bottleneck in the CPU 203. In the present example, a server for implementing embodiments of the present disclosure may have two NUMA sockets. However, it should be noted that the design disclosed herein could be extended to a server including additional NUMA sockets.

Software for implementing embodiments of the present disclosure may be designed to process packets from the network including a storage system. Also, the software may be distributed across multiple NVME drives 308. For example, for KV-based drives, a drive 308 may be selected by a drive-processing module 324 (described further below) of the CPU 303 using any suitable hashing algorithm such as a Rendezvous hashing algorithm (e.g., a highest random weight (HRW) algorithm). The Rendezvous hashing algorithm may use two parameters—a key (e.g., an object key corresponding to a value to be stored on a drive 308), and a drive ID (e.g., a unique identifier or an input/output (IO) identification corresponding to the drive 308 on which the data is to be stored). The suitable hashing algorithm may be used when an associated request processing has associated metadata that is sought to be preserved across multiple IO request to a same key.

For example, there may be a list of storage devices or drives 308, with one of the drives 308 to be ultimately selected for use for access or storage of a given key. Accordingly, for each drive 308, there may be an identification/string that represents the drive id, each drive 308 having a unique drive id. To select a drive 308 for storing the key, a Rendezvous hash may be calculated for each of the drives 308 on the list based on the input of the key and each respective drive ID. Similarly, for any incoming request 312, the request 312 may be identified by the hash calculated by the Rendezvous hashing algorithm, which will be unique for every key-drive combination. Accordingly, the system can avoid implementing a separate table stored on a drive for mapping which drives store which keys, thereby further improving system efficiency.

Accordingly, if data is written, and a readback command for the data is issued, the Rendezvous hashing algorithm ensures that the same data is accessed by ensuring access the same drive 308. In more detail, this may be accomplished by computing a number (e.g., a number between 0 and 1) for each drive 308 corresponding to a hash of a combination of the key of the IO request 312 and the respective drive ID of each drive 308, by then comparing all of the numbers, and by then selecting the highest computed number as corresponding to the drive 308 that is to be selected for that particular IO request 312. Although a Rendezvous hashing algorithm is discussed herein, it should be noted that other hashing algorithms or functions may be used in accordance with other embodiments of the present disclosure.

The software running on the CPU 303 may be sub-divided into different components. Each component may be tasked with the responsibility of perform a given action or set of actions on all of the packets processed in the storage system. Two main components may be 1) the module 322 that processes the IO requests 312 arriving at the NIC 304 (e.g., for performing network processing), and 2) the module 324 that processes the NVME queues of the drives 308 (e.g., for performing drive processing or drive IO processing). Herein, these modules may be respectively referred to as a network-processing module 322 and a drive-processing module 324. The network-processing module 322 may use an RDMA (remote direct memory access) protocol for processing requests, while the drive-processing module 324 may use TCP (transmission control protocol) for data processing.

Accordingly, by using the individual modules, embodiments of the present disclosure may improve IO performance by reducing a likelihood of a bottleneck restricting data flow due to the limitations of the CPU 303. Each of the modules 322, 324 may use an amount (e.g., a specified amount) of bounded CPU resources. That is, each of the modules 322, 324 may allocate a respective set of cores 302 to be used by the modules 322, 324 to achieve improved or optimized performance.

For instance, in the present example, each NIC 304 may use about four cores running at 2.10 GHz to provide the full throughput of a 100G network while transferring 2 MB objects using NVME over TCP. It should be noted, however, that the number used in the present example may change according to the specifications of the system.

For inbound network connections, a given number of cores 302 of the CPU 303 may be preallocated for an NIC 304 with affinity to a NUMA node 314 at which the NIC 304 is attached. The NUMA nodes 314 may be referred to as a respective CPU-memory couples. For example, the CPU socket and the selected memory 306/bank of drives 308 build a respective NUMA node 314. Conventionally, whenever a CPU sought to access the memory of a different NUMA node, the CPU could not directly access the memory of the other NUMA node, and was instead required to access the memory of the other NUMA node by going through a separate CPU that owned the memory In embodiments of the present disclosure, however, all connections may be processed by using a set of preallocated cores 302 of the CPU 303. The network-processing module 322 for processing the requests 312 arriving at the NIC 304 may respectively allocate all of the connections by using a round-robin allocation scheme combined with usage monitoring (e.g., for monitoring the number of connections on each core 302) to enable stateless processing. That is, each of the connections corresponding to the requests 312 may be assigned to the cores 302 on a round-robin basis to balance the loading of the cores 302 to thereby improve bandwidth from the drives 108. If the drive-processing module 324 determines that a given core 302 is underperforming or is otherwise unable to handle any additional connections, the drive-processing module can ensure no additional connections are mode with the given core 302. Accordingly, assuming each client is trying to share the bandwidth of the network equally, the storage system can ensure that the load is balanced across all available cores 302.

Similarly, for processing the requests 312 to the NVME queues, a respective drive-processing module 324 may run on a dedicated set of cores 302 on both of the NUMA sockets of the server (e.g., in the storage server, the drives 308 will be on both of the NUMA sockets). Because each request 312 may be distributed to any drive 308, some otherwise undesirable cross-NUMA memory copying by the drives 308 may occur (e.g., between the memory 306 of the first NUMA node 314a and the drives 308 of the second NUMA node 314b, and vice versa). However, because the Rendezvous hashing algorithm is used for selecting the drive 308, the distribution may be balanced for normal usage scenarios.

Accordingly, a system with cross-NUMA transfer bandwidth (corresponding to cross-NUMA transfer requests 320) that is more than half of the NIC bandwidth (corresponding to the IO requests 312) may be able to run without degradation in system performance. An IO module (e.g., the drive-processing module 324) may handle requests to the drives 308 from all of the connections. Also, the drive-processing module 324 may use a bounded number of CPU cores 302, which may be based on the number of available drives 308 on the server.

Further, the requests 312 that are forwarded to IO threads 316 (e.g., the threads 116 shown in FIG. 1) may be selected by any suitable algorithm such as a round-robin algorithm. For example, the requests 312 may be forwarded between the network-processing module 322 and the drive-processing module 324 using an atomic ring buffer 116 (see FIG. 1). That is, once one of the modules 322, 324 has completed processing of data of a request 312 in accordance with its role, the request 316 may be forwarded to the other one of the modules 322, 324. The atomic ring buffer 116 enables a lockless design, thereby achieving relatively high throughput. The atomic ring buffer 116 uses a co-operative thread-scheduling without blocking calls in any function.

Embodiments of the present disclosure may also accommodate the addition of other modules for performing other tasks. Further, a different algorithm may be used to distribute the requests 312 across the threads 316 of a given module. Also, an entirety of a design of embodiments of the present disclosure may be based on a logical framework that allows different modules to run on the same core 302, which may be useful if the core 302 has a sufficient number of CPU cycles allotted for processing a number of requests 312 that exceeds that which is required by the module.

As described above, because each IO thread 316 can communicate directly to all of the queues of the drives 308, and because there may be another set of queues for each core 308, embodiments of the present disclosure are able to omit locking synchronization that would otherwise may be needed, as each IO thread 316 is able to access its own individual queues to the drives 308.

Further, when any new IO request 312 occurs, the system is able to select between the numerous IO cores 302. In a NUMA-based system, according to some embodiments, selection of one of the IO cores 302 having a smallest physical distance to the corresponding memory/DRAM 306 may be a criteria to help ensure sufficient performance.

Accordingly, by going in a round robin fashion, or by balancing across all of the cores 302, improved bandwidth of the drives 308 may be achieved.

Additionally, because each CPU 303 is provided with a channel to access each associated memory 306 and bank of drives 308, the system is able to avoid the limited bandwidth otherwise associated with the bottlenecking that comes with cross-NUMA channel access 320.

Figure 4:
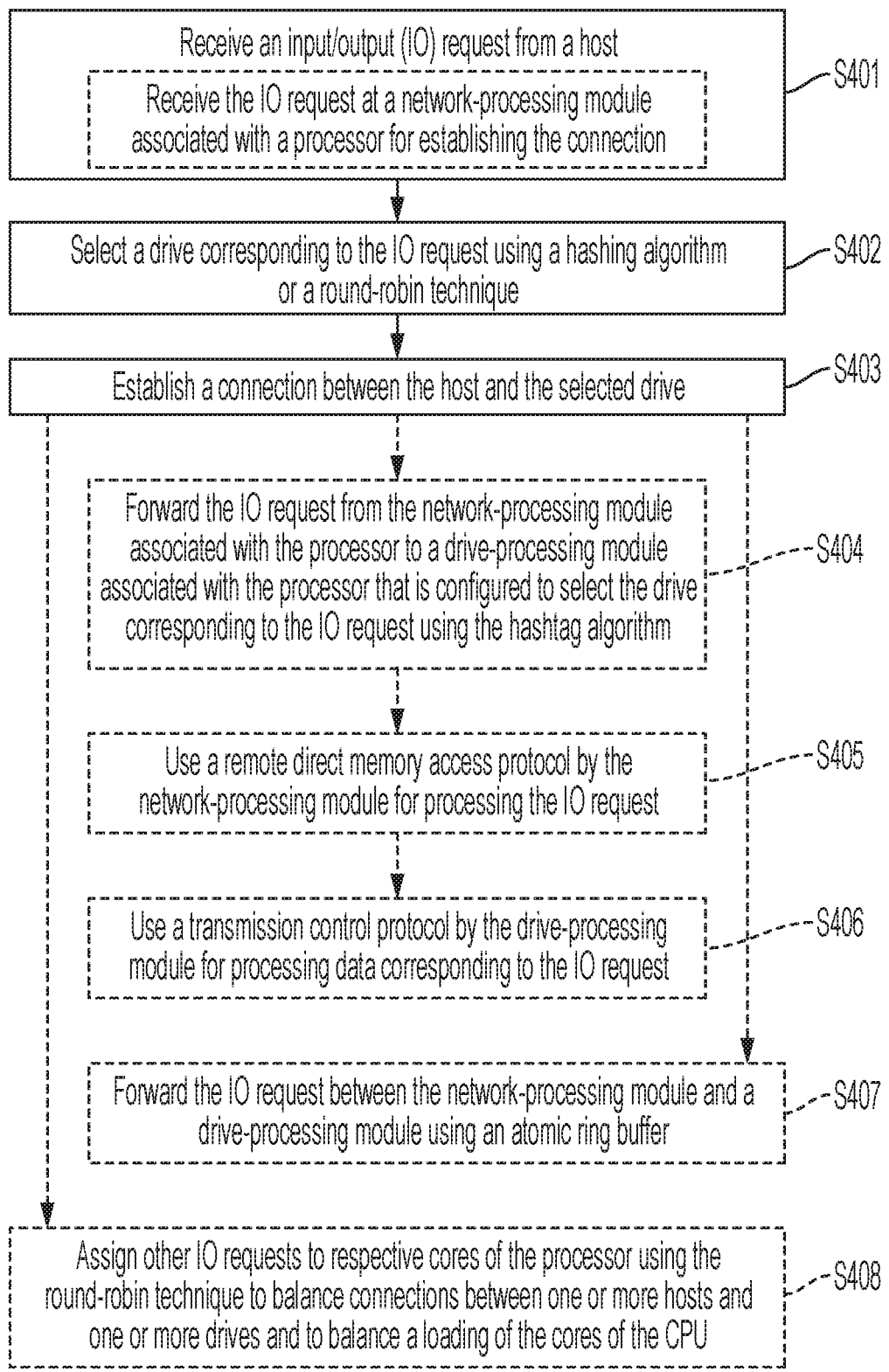
FIG. 4 shows a flowchart depicting a method of packet processing.

FIG. 4 shows a flowchart depicting a method of packet processing.

Referring to FIG. 4, at S401, a core of a processor may receive an input/output (IO) request from a host (e.g., one of the cores 102a of the CPU 103 of FIG. 1 may receive the IO request 312 of FIG. 3). The core of the processor may receive the IO request at a network-processing module associated with a processor for establishing the connection (e.g., the network-processing module 322 of FIG. 3). At S402, a drive-processing module (e.g., the drive-processing module 324 of FIG. 3) may select a drive corresponding to the IO request (e.g., one of the drives 108 or 308 of FIGS. 1 and 3) using a hashing algorithm or a round-robin technique. In some embodiments, the hashing algorithm that is used may be a Rendezvous hashing algorithm based on a key corresponding to the IO request and a drive ID of the drive. At S403, a connection may be established between the host and the selected drive.

At S404, the network-processing module may forward the IO request associated with the processor to the drive-processing module associated with the processor that is configured to select the drive corresponding to the IO request using the hashing algorithm. At S405, the network-processing module may use a remote direct memory access protocol for processing the IO request. At S406, the drive-processing module may use a transmission control protocol for processing data corresponding to the IO request.

At S407, an atomic ring buffer (e.g., the atomic ring buffer 116 of FIG. 1) may forward the IO request between the network-processing module and a drive-processing module.

At S408, the network-processing module may assign other IO requests to respective cores of the processor using the round-robin technique to balance connections between one or more hosts and one or more drives and to balance a loading of the cores of the CPU.

Thus, embodiments of the present disclosure are able to reduce or eliminate CPU bottlenecking by using modules having allocated CPU resources to balance loads among CPU cores and storage devices, thereby improving data storage technology.

While the present disclosure has been particularly shown and described with reference to some example embodiments thereof, it will be understood by those of ordinary skill in the art that various changes in form and details may be made therein without departing from the spirit and scope of the present disclosure as set forth in the following claims and their equivalents.

What is claimed is:

1. A method of packet processing, the method comprising:
receiving an input/output (IO) request from a host;
generating a first hash result using a hashing algorithm based on inputs of both a first drive ID of a first drive and an object key of a key-value pair corresponding to the IO request;
generating a second hash result using the hashing algorithm based on inputs of both a second drive ID of a second drive and the object key of the key-value pair corresponding to the IO request;
selecting a drive corresponding to the IO request based on a comparison of the first hash result to the second hash result; and
establishing a connection between the host and the drive, wherein the object key has a one-to-one correspondence with a value to be stored on the drive, the value being of the key-value pair.

2. The method of claim 1, wherein the hashing algorithm that is used is a Rendezvous hashing algorithm, and
wherein the IO request is identified by a hash calculated by the Rendezvous hashing algorithm, and is unique for every key-drive combination.

3. The method of claim 1, wherein receiving the IO request from the host comprises receiving the IO request at a network-processing module associated with a processor for establishing the connection.

4. The method of claim 3, further comprising forwarding the IO request from the network-processing module associated with the processor to a drive-processing module associated with the processor that is configured to select the drive corresponding to the IO request using the hashing algorithm.

5. The method of claim 4, further comprising using a remote direct memory access protocol by the network-processing module for processing the IO request; and
using a transmission control protocol by the drive-processing module for processing data corresponding to the IO request.

6. The method of claim 3, further comprising forwarding the IO request between the network-processing module and a drive-processing module using an atomic ring buffer.

7. The method of claim 3, further comprising respectively assigning one or more other IO requests to one or more cores of the processor, based on a physical distance from the one or more cores to a corresponding memory, to balance one or more connections between one or more hosts and one or more drives, and to balance a loading of the cores of the processor.

8. A system for packet processing, the system comprising a processor comprising cores, and a drive-processing module, wherein:
one of the cores is configured to receive an input/output (IO) request from a host;
the drive-processing module is configured to:
generate a first hash result using a hashing algorithm based on inputs of both a first drive ID of a first drive and an object key of a key-value pair corresponding to the IO request;
generate a second hash result using the hashing algorithm based on inputs of both a second drive ID of a second drive and the object key of the key-value pair corresponding to the IO request; and
select a drive corresponding to the IO request based on a comparison of the first hash result to the second hash result;
the processor is configured to establish a connection between the host and the drive; and
the object key has a one-to-one correspondence with a value to be stored on the drive, the value being of the key-value pair.

9. The system of claim 8, wherein the hashing algorithm that is used is a Rendezvous hashing algorithm, and
wherein the IO request is identified by a hash calculated by the Rendezvous hashing algorithm, and is unique for every key-drive combination.

10. The system of claim 8, further comprising a network-processing module, wherein the one of the cores is configured to receive the IO request from the host by receiving the IO request at the network-processing module for establishing the connection.

11. The system of claim 10, wherein the network-processing module is configured to forward the IO request to the drive-processing module, which is further configured to select the drive corresponding to the IO request using the hashing algorithm.

12. The system of claim 11, wherein the network-processing module is further configured to use a remote direct memory access protocol for processing the IO request; and
wherein the drive-processing module is further configured to use a transmission control protocol for processing data corresponding to the IO request.

13. The system of claim 10, further comprising an atomic ring buffer that is configured to forward the IO request between the network-processing module and a drive-processing module.

14. The system of claim 10, wherein the network-processing module is further configured to respectively assign one or more other IO requests to one or more cores of the processor, based on a physical distance from the one or more cores to a corresponding memory, to balance one or more connections between one or more hosts and one or more drives, and to balance a loading of the cores of the processor.

15. A non-transitory computer readable medium implemented on a system for packet processing, the non-transitory computer readable medium having computer code that implements a method of packet processing, the method comprising:
receiving an input/output (IO) request from a host;
generating a first hash result using a hashing algorithm based on inputs of both a first drive ID of a first drive and an object key of a key-value pair corresponding to the IO request;
generating a second hash result using the hashing algorithm based on inputs of both a second drive ID of a second drive and the object key of the key-value pair corresponding to the IO request;
selecting a drive corresponding to the IO request based on a comparison of the first hash result to the second hash result; and
establishing a connection between the host and the drive, wherein the object key has a one-to-one correspondence with a value to be stored on the drive, the value being of the key-value pair.

16. The non-transitory computer readable medium of claim 15, wherein the hashing algorithm that is used is a Rendezvous hashing algorithm, and
wherein the IO request is identified by a hash calculated by the Rendezvous hashing algorithm, and is unique for every key-drive combination.

17. The non-transitory computer readable medium of claim 15, wherein receiving the IO request from the host comprises receiving the IO request at a network-processing module associated with a processor for establishing the connection.

18. The non-transitory computer readable medium of claim 17, wherein the computer code is further configured to implement the method of packet processing by causing the network-processing module associated with the processor to forward the IO request to a drive-processing module associated with the processor, and by causing the drive-processing module to select the drive corresponding to the IO request using the hashing algorithm.

19. The non-transitory computer readable medium of claim 17, wherein the computer code is further configured to implement the method of packet processing by causing an atomic ring buffer to forward the IO request between the network-processing module and a drive-processing module.

20. The non-transitory computer readable medium of claim 17, wherein the computer code is further configured to implement the method of packet processing by causing the network-processing module to respectively assign one or more other IO requests to one or more cores of the processor, based on a physical distance from the one or more cores to a corresponding memory, to balance one or more connections between one or more hosts and one or more drives, and to balance a loading of the cores of the processor.

* * * * *